United States Patent Office 3,451,653
Patented June 24, 1969

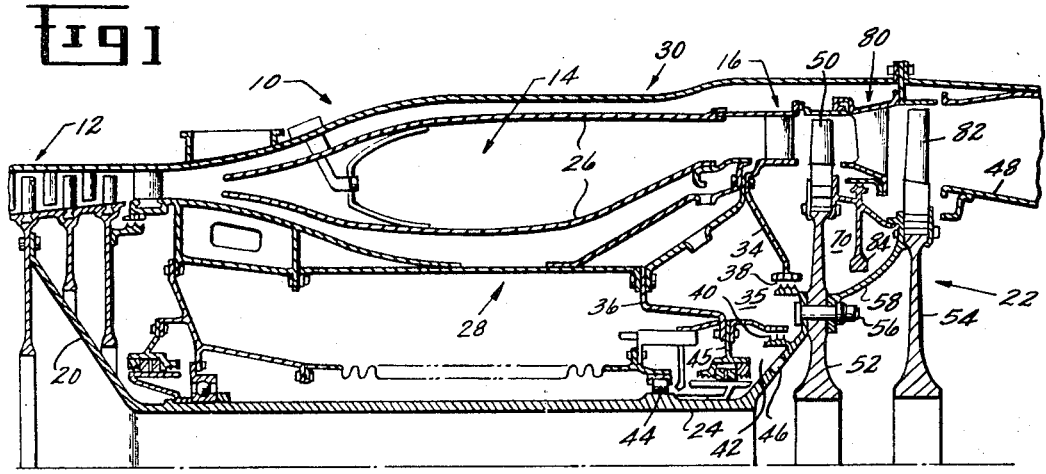
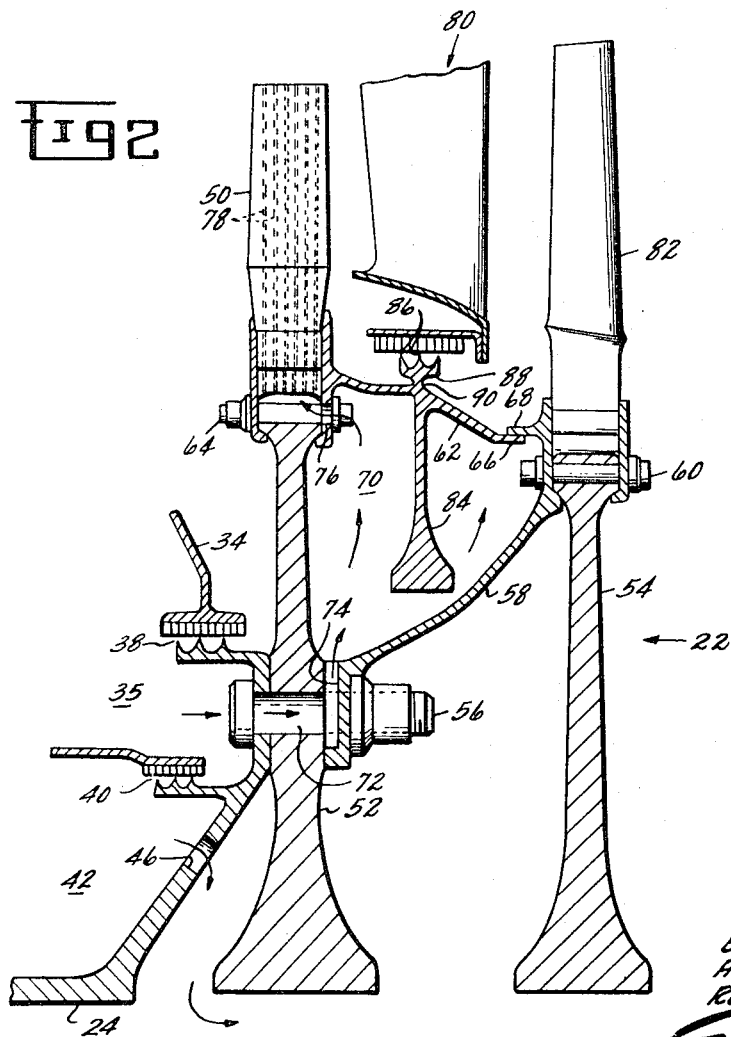

3,451,653
TURBOMACHINERY ROTORS
Bernard L. Koff, Albert P. Sterman, and Robert J. Corsmeier, Cincinnati, Ohio, assignors to General Electric Company, a corporation of New York
Filed Mar. 22, 1967, Ser. No. 625,044
Int. Cl. F01d 1/04, 5/14
U.S. Cl. 253—39                    6 Claims

ABSTRACT OF THE DISCLOSURE

A turbine rotor comprises two stages and has first and second bladed discs 52, 54 interconnected by a conical torque member. A heat shield 62 is secured adjacent the periphery of one disc and is telescopingly received by the other disc to define the inner boundary of the gas stream passing through the turbine. A nozzle diaphragm between the two stages of the rotor is provided at its inner surface with a labyrinth type gas seal formed by labyrinth teeth 86 projecting from a ring 88 that is spaced from and connected to the heat shield 62 by a rim 90. Coolant and lubrication sump pressurization air are directed through the rotor in a manner minimizing pressure differentials on the rotor discs.

---

The present invention relates to improvements in turbine rotor structures particularly adapted for use in gas turbine engines.

Turbines employed in gas turbine engines are of the axial flow type wherein an annular gas stream passes through a bladed rotor which is connected to and drives the compressor of the engine. One of the most serious problems in the operation of such turbines is in meeting the challenge of operating at ever-increasing gas stream temperatures which are requisite for providing greater thrust to weight ratios for engines to be used in the propulsion of aircraft.

These problems are of greater significance in two-stage turbines wherein the turbine rotor has two axially spaced, circumferentially spaced rows of blades or buckets respectively comprising the first and second stages of the turbine. A circumferential row of stator vanes is disposed between the two rows of rotor buckets to properly direct the hot gas stream from one turbine stage to the other. It is essential that the losses of the hot gas stream between the turbine rotor and the vane assembly be minimized, and to this end it is conventional to provide a seal of the labyrinth type.

The turbine rotor structure must therefore make provision for transmission of force loadings, primarily torque, from the two rows of turbine buckets to the output shaft of the turbine, make provision for the circulation of cooling air around the inner portions of the turbine structure which function as a heat sink, as well as for the passage of cooling air to and through at least the first stage turbine buckets, and additionally provide a seal with the stationary vane structure intermediate the two rows of turbine buckets.

These functional requirements are complicated by the thermal gradients which necessarily exists between the inner portions of the turbine rotor structure and the outer portions thereof which are exposed to the hot gas stream. Further, pressure differentials exist between the cooling air employed and the hot gas stream itself, which, in the past, have imposed undesirable stresses on the turbine rotor. Beyond this, where the turbine rotor is to be employed in a gas turbine engine for the propulsion of aircraft, weight becomes of prime importance, and, therefore, the turbine structure requires a minimum of mass of material to provide these desired functions consistent with the strength of materials which can be economically used.

One object of the invention, therefore, is to provide an improved turbine rotor structure which fulfills the desired functional purposes set forth above and which is particularly effective in tolerating large thermal gradients with a lightweight structure.

Another object of the invention is to provide an improved rotary seal between a turbine rotor and a vane assembly or diaphragm intermediate rows of turbine buckets on the rotor, and particularly to do so in a lightweight turbine structure in accordance with the above ends.

The above ends are attained in a turbine rotor construction wherein a first stage turbine disc is connected to a shaft and a second stage turbine disc is connected to the first stage disc by a torque cone which terminates outwardly adjacent the bases of the blades on the second stage disc. A heat shield extends between the two discs and is secured to one disc and has a telescoping connection relative to the other disc. Preferably the heat shield has intermediate its length a raised ring forming, in part, the seal between the two turbine stages.

The above and other related objects and features of the invention will be apparent from a reading of the following description of the disclosure found in the accompanying drawing and the novelty thereof pointed out in the appended claims.

In the drawing:
FIGURE 1 is a diagrammatic, longitudinal section of a portion of a gas turbine engine embodying the present invention and
FIGURE 2 is a longitudinal section through a turbine rotor structure seen in FIGURE 1.

FIGURE 1 illustrates a gas turbine engine 10 which comprises a compressor 12 which pressurizes air for supporting combustion of fuel in a combustor 14. The hot gas stream generated in the combustor then passes through a turbine 16 and is discharged through a nozzle (not shown) to provide a propulsive force.

The compressor 12 and turbine 16 respectively comprise bladed rotors 20, 22 which are interconnected by a shaft 24. The hot gas stream in passing through the turbine 16 drives the turbine rotor 22, thereby powering the turbine rotor 20 in the usual fashion.

The combustor 14 comprises liners 26 which are spaced from inner and outer casings 28 and 30. The air discharged from the compressor 12 flows between the liners to support combustion and also flows around the outer surfaces of the liners to provide cooling air therefor. The relatively cool compressor discharge air further passes to an annular chamber 35 defined by structural members 34, 36, which terminate at labyrinth seals 38, 40 respectively on the turbine rotor 22. Some air leaks through the seal 40 to pressurize a chamber 42 at one end of a bearing 44 for the shaft 24. Pressurization of the chamber 42 minimizes, if not prevents, leakage of oil from sump 45 for the bearing. This pressurizing air then passes through holes 46 formed in an adjacent conical portion of the shaft 24. The air may then flow through the rotor 22 and be discharged back into the hot gas stream at the juncture between the turbine rotor 22 and a plug 48 (only a fragmentary portion is shown). Air also flows from the chamber 35 to the interior of the rotor 22 to provide cooling air for blades 50 mounted on the rotor 22, as will be apparent from the following detailed description of the construction of the rotor 22.

Referring now to FIGURE 2, it will be seen that the rotor 22 comprises a pair of discs 52, 54. The disc 52 is connected to the conical portion of the shaft 24 by bolts 56. The second stage disc 54 is connected to the first stage disc 52 by a torque cone 58. The torque cone 58 is secured to the first stage disc 52 by the bolts 56 and secured to the second stage disc 54 by bolts 60. A heat shield 62 is secured to the first stage disc 52 by bolts 64 and terminates at its opposite end in a cylindrical portion 66 which is telescopingly received by a circumferential rim 68 formed on the disc 54 advantageously as an integral part of the torque cone 58.

It will be seen that the first stage disc 52, the torque cone 58, and the heat shield 62 define an annular chamber 70 whose longitudinal half section is roughly triangular. Cooling air passes to the chamber 70 from the chamber 35 through holes 72 formed in the disc 52 and shaft 24 and registering grooves 74 formed in the torque cone 58. Cooling air then passes from the chamber 70 through holes 76 in the heat shield 62 to holes 78 formed in the blades 50. The cooling air enables operation of the turbine at much higher temperatures for the hot gas stream. Since the second stage of the turbine is usually substantially lower than that at the first stage, it is many times not necessary to provide cooling air for the blades of the second stage. However, it is obvious that such could be done if desired.

The described mounting arrangement provides several advantages. First it will be pointed out that the torque from the second stage is transmitted solely through the torque cone 58 to the first stage disc 52. The torque is then transmitted from the first stage disc directly to the conical portion of the shaft 24. There is thus no redundancy of structural elements in transmitting the torque load, or any other loadings on the turbine rotor.

The hot gas stream, after passing through the first stage of the turbine, exits from the blades 50 and enters a nozzle vane assembly or diaphragm 80 which properly directs the gas stream towards the blades 82 mounted on the second stage disc 54. The heat shield 62 defines the inner bounds of the hot gas stream as it passes to and from the diaphragm 80. The heat shield, however, is not a load carrying member, inasmuch as the cylindrical portion 66 is free to slide axially relative to the flange 68. Thus any temperature differential which may exist between the heat shield 62 and torque cone 58 will not result in a build-up of stresses in either member because of a differential in the thermal expansion of the two members. This is to say that the heat shield 62 will normally be exposed to higher temperatures than the torque cone 58 and thus will have a greater thermal growth. Such thermal growth is accommodated by the heat shield 62 telescoping further into the flange 68. It will also be apparent that the more highly stressed, load bearing torque cone 58 is isolated from the high temperatures of the hot gas stream by the heat shield 62, whereas the latter member has no substantial axial or torque loads imposed thereon. The heat shield 62 has a disc 84 formed integrally therewith in a conventional fashion to make it capable of withstanding the high stresses resulting from the large centrifugal forces thereon during rotation of the turbine rotor.

Another feature to be noted in connection with the heat shield is the provision of labyrinth teeth 86 which are formed on a ring 88 spaced outwardly from the heat shield 62 and connected thereto by an integral circumferential rib 90. The labyrinth teeth 88 form a seal with the inner surface of the nozzle diaphragm to maintain a pressure differential thereacross. Preferably the rib 90 is radially of the disc 84. By forming the labyrinth teeth 88 in this fashion, the thermal stresses thereon are minimized and, further, in the event of a cracking or loss of a portion of a tooth, the structural integrity of the heat shield is maintained so that major damage or loss of power is avoided.

Other features to be noted in this structure are that the pressure differentials across the second stage disc 54 and clamping studs 60 are greatly minimized in an axial direction. Thus, the portion of the disc 54 inwardly of the clamping studs 60, which could produce the worst loading problem, is exposed on its opposite sides to the same air pressure, since the interior of the rotor 22 from the conical portion of shaft 24 and the torque cone 58 is in direct communication with the rear end face of the disc 54, which is vented to the hot gas stream at the juncture with the nozzle plug 48.

Various modifications of the present invention will be apparent to those skilled in the art and the scope thereof is to be determined solely from the following claims.

Having thus described the invention, what is claimed as novel and desired to be secured by Letters Patent of the United States is:

1. An axial flow turbine including,
a turbine rotor comprising,
a first stage disc having turbine buckets extending from and spaced around its periphery,
a second stage disc also having turbine buckets extending from and spaced around its periphery,
a shaft connected to one of said discs adjacent the center thereof, a torque cone interconnecting said discs and extending outwardly from said one disc to said other disc, and
a heat shield escured to one of said discs adjacent its periphery and extending into telescoping relation with the other disc adjacent its periphery, said heat shield defining in part the inner flow path of a gas stream through said turbine,
whereby substantially all the force loadings between said discs are transmitted through said torque cone and are therefore unaffected by thermal gradients in said turbine rotor due to the absence of redundant supports between the discs.

2. In a gas turbine engine having an axial flow compressor, an axial flow turbine as in claim 1 wherein,
said shaft is connected to the compressor and
said shaft includes a conical portion connected to said first stage disc and forming in general a continuation of the torque cone.

3. In a gas turbine engine as in claim 2 wherein,
means are provided for directing cooling air from said compressor into the annular chamber defined by said duct cone heat shield and first stage disc and
means are provided for directing the cooling air from said chamber to the buckets of said first stage disc.

4. In a gas turbine engine as in claim 3 wherein,
the means for directing the cooling air comprise a chamber having an annular outlet generally aligned with the connection between the conical portion of the shaft and the first stage disc and passageway means through said disc and said torque cone for the introduction of cooling air into said chamber.

5. An axial flow turbine as in claim 1 wherein,
a nozzle diaphragm is interposed between the buckets of said first and second stage discs and a gas seal is provided between said heat shield and said diaphragm,
said gas seal comprising a ring formed integrally with said heat shield and spaced outwardly therefrom by a radially extending, relatively thin, circumferential rim.

6. The structure of claim 5 further characterized by and including a reinforcing disc integrally formed with said heat shield and projecting radially inwardly thereof in substantial alignment with said circumferential rim.

(References on following page)

References Cited

UNITED STATES PATENTS

| | | | |
|---|---|---|---|
| 3,034,298 | 5/1962 | White | 60—39.66 |
| 3,057,542 | 10/1962 | Keenan et al. | |
| 3,146,938 | 9/1964 | Smith. | |
| 3,295,825 | 1/1967 | Hall. | |
| 3,343,806 | 9/1967 | Bobo et al. | 253—39.1 |
| 3,356,340 | 12/1967 | Bobo. | |

FOREIGN PATENTS

| | | |
|---|---|---|
| 961,483 | 11/1949 | France. |
| 1,057,171 | 10/1953 | France. |
| 810,652 | 3/1959 | Great Britain. |

EVERETTE A. POWELL, Jr., *Primary Examiner.*

U.S. Cl. X.R.

253—39.15